United States Patent [19]

Perlus et al.

[11] 4,168,181
[45] Sep. 18, 1979

[54] WIRE MANUFACTURE

[75] Inventors: Thomas A. Perlus, Dollard des Ormeaux; John T. Griffiths, Vankleek Hill; Malcolm Coburn, Hawkesbury, all of Canada

[73] Assignee: Eastern Steelcasting, Division of Sivaco Wire & Nail Company, L'Orignal, Canada

[21] Appl. No.: 873,786

[22] Filed: Jan. 31, 1978

[30] Foreign Application Priority Data

Dec. 12, 1977 [CA] Canada .................................. 292877

[51] Int. Cl.² ......................... C21D 1/58; C21D 7/02
[52] U.S. Cl. .................................... 148/2; 148/12 B; 148/36
[58] Field of Search ................. 148/2, 12 B, 12 F, 36, 148/156; 75/123 B

[56] References Cited

U.S. PATENT DOCUMENTS

| 3,725,143 | 4/1973  | Alworth        | 75/123 B |
| 3,834,948 | 9/1974  | Brickner et al.| 148/2    |
| 3,950,191 | 4/1976  | Ito et al.     | 75/123 B |
| 3,988,173 | 10/1976 | Kawano         | 148/36   |
| 3,988,174 | 10/1976 | Kawano         | 148/36   |
| 4,029,934 | 6/1977  | Clark et al.   | 75/123 B |

Primary Examiner—I. Dewayne Rutledge
Assistant Examiner—Peter K. Skiff

[57] ABSTRACT

Wire is made by cold working rod made from continuously cast silicon-killed boron steel made in an electric furnace from a charge of essentially 100% cold scrap.

11 Claims, 1 Drawing Figure

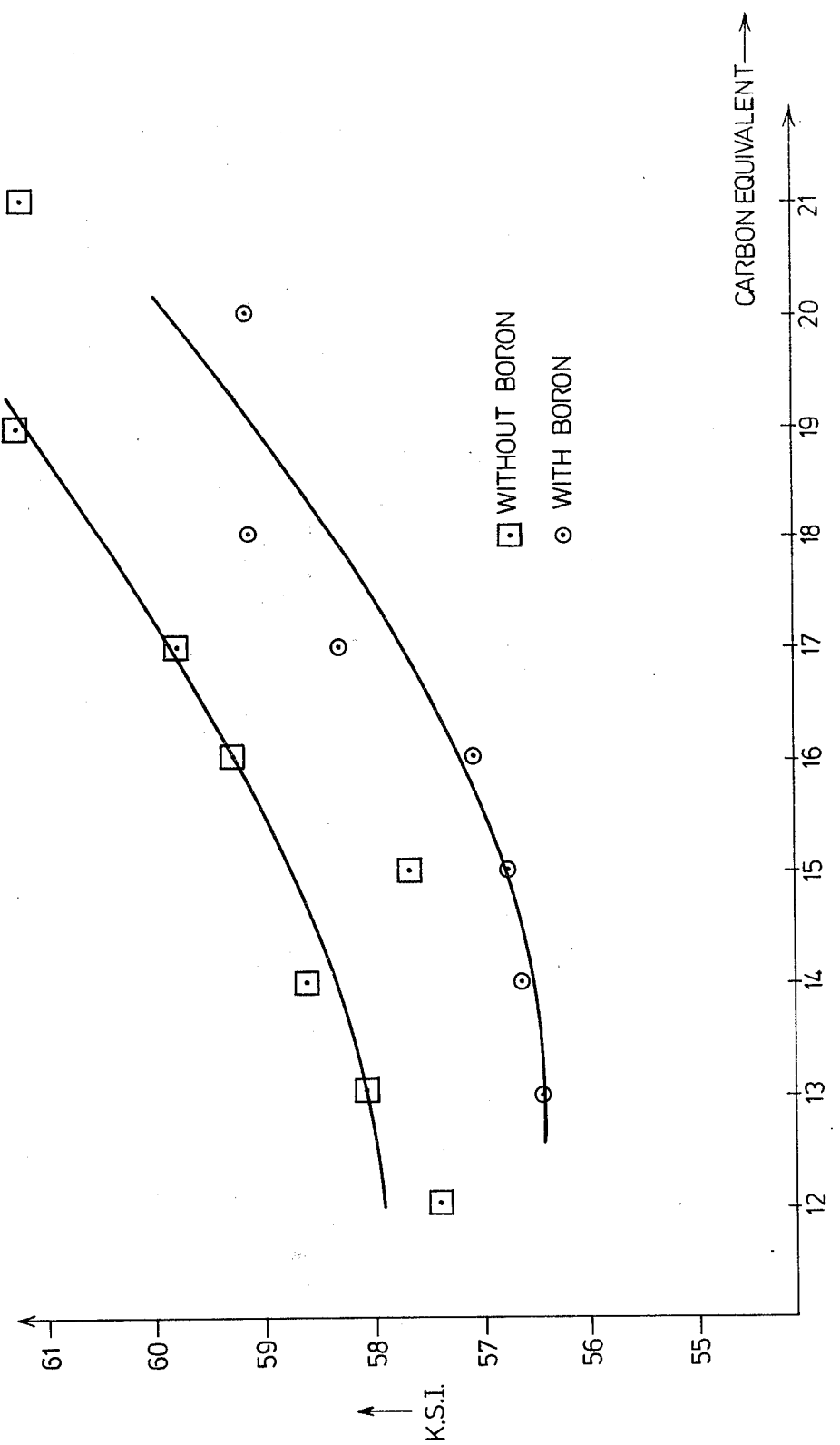

ns/4,168,181

WIRE MANUFACTURE

BACKGROUND OF THE INVENTION

1. Field of the Invention

This invention relates to the manufacture of cold-worked steel wire.

2. Description of the Prior Art

The making of steel wire is a specialized art which requires the selection of steel which, after being subjected to the strenuous forces of cold drawing through one or usually several dies to attenuate it and reduce its diameter, retains the properties essential to good wire. The wrong steel may have a work-hardening rate such that cold drawing will raise its tensile strength to the point where its loss of ductility is too great and causes wire-drawing breaks or results in surface discontinuities giving a surface of the wire not suitable for the end use, for example, plating.

Steel on the market varies widely in chemical composition and physical properties. The wire manufacturer is limited to the selection of those steels which may be coldworked to produce a good quality end product, which are not so tough in the unannealed state to produce breaks during cold working or to result in short die life and which, at the same time, can be produced economically. For this reason, low-carbon, low-silicon rim steel has generally been used where heavy reductions are required in making wire, in contrast to other available steel, for example, silicon-killed steel or boron steel, which have been thought to be tougher for wire drawing.

SUMMARY OF THE INVENTION

The applicants have found that, contrary to this thinking, good quality wire can be produced by cold working without the necessity of annealing, continuously cast boron modified low-carbon silicon-killed steel produced by melting essentially 100% ferrous scrap in the electric furnace.

The analysis of such steel is as follows. The carbon may vary between a maximum of about 0.15% to a practical minimum of about 0.04% with a preferred range being from about 0.10% to about 0.05%. The manganese may range from about 0.65% to about 0.30%, with from about 0.45% to about 0.30% preferred. The silicon is within the range from about 0.05% to about 0.25%, a preferred range being from about 0.07% to about 0.15%. The residuals content is less than about 0.90%, with less than about 0.50% preferred. The boron analysis is within the range from about 0.0005% to about 0.02%, with from about 0.005% to about 0.01% preferred. The aluminum analysis may be from 0% to about 0.035% with not more than about 0.010% preferred. The remainder is iron and incidental impurities. The steel is substantially free of deoxidizing elements and deoxidization products thereof, other than manganese, silicon, where present small amounts of aluminum, and boron. All these amounts are by weight.

An important requirement in the steel is that the residuals be kept below a certain maximum. "Residuals" are residual elements as defined in the specification given at page 389 of the "1977 Annual Book of ASTM Standards (Part 3)" published by the American Society for Testing and Materials, hereby incorporated by reference and summarized as follows:

"In all carbon steels small quantities of certain residual elements unavoidably retained from raw materials are sometimes found which are not specified or required, such as copper, nickel, molybdenum, chromium, etc. These elements are considered as incidental and are not normally determined or reported."

Steels of the above description in which the residuals do not exceed about 0.50% are preferred as providing, with the boron modification excellent properties in the coldworked wire. Low-carbon steels with residuals higher than 0.50% up to about 0.90% can exhibit some benefit from the boron modification, but this improvement may be partially or totally offset by the increase in strength attributed to the increase in residuals. Where an amount of boron within the upper part of the range is used the precise amount must be selected with caution to avoid hot-shortness.

Surprisingly, having regard to the undue toughness one skilled in the art would normally attribute to this continuously strand-cast silicon steel made in the electric furnace, not only can wire be produced from it in continuous lengths by cold working in the conventional manner but such wire is of excellent quality. It has excellent surface integrity, good ductility and acceptable tensile strength values.

DESCRIPTION OF THE PREFERRED EMBODIMENTS

Steel of the type described has an average tensile strength reduction over steels of the same chemistry not treated with boron of approximately 2000 psi (Ultimate Tensile Strength). The attached drawing contains a curve showing the effect of the boron addition, according to the invention, on low-carbon silicon-killed electric furnace steels made from a charge of essentially 100% scrap. Rod ultimate tensile strength (K.S.I.) is plotted against carbon equivalent (C.E.) for heats with and without the addition of boron.

The cold working may involve light reduction to about 40% through one or two dies, medium reduction from about 30% to about 65% through three to five dies, or heavy reduction from about 60% to about 95% through four to ten dies. Good quality wire may be produced without breaks during cold working and without the necessity of annealing, which is an undesirable extra step which may produce difficulty in the pickling process.

Among the advantages of the invention is that the steel employed may be produced in low capital cost mini-mills by melting essentially 100% ferrous scrap in an electric furnace, killing it with silicon, then continuously strand-casting it to form small billets. In this process some factors not inherent in other steel making processes are unavoidable, namely, the level of residuals in the steel is higher, some of the silicon required to deoxidize the molten steel, prior to the casting of small billets, remains in the steel, and the nitrogen level in the steel is higher. The applicants have found, however, if such negative factors are kept below a certain threshold the resulting steel may be successfully cold worked to make wire. Full advantage may, therefore, be taken of the advantage of using essentially 100% scrap as the electric furnace charge.

The steel employed in the invention is produced as follows. Scrap is carefully selected having a low residuals content of not more than about 0.50%. This scrap is charged cold into the electric furnace and melted at a temperature from about 2850° F. to about 3020° F. and the melt adjusted so that the charge contains not more than about 0.15% carbon and not more than about 0.65% manganese. The melt, tapped into a ladle, is treated with silicon, for example, in the form of ferrosilicon in an amount effective to deoxidize the melt and to give a silicon content in the resulting steel of not greater than about 0.25%. Boron is added to give a boron analysis in the resulting steel within the range from about 0.0005% to about 0.02%, preferably from about 0.005% to about 0.01%. The silicon and boron additions are preferably added to the tapping streams. Aluminum may, if desired, be added in an amount up to about 0.035% with not more than about 0.010% preferred. All the amounts stated are by weight.

The molten steel from the ladle is then poured into a continuous casting machine and strand-cast into billets, for example, square billets having sides of not more than about 8 inches in width, preferably about 4 inches. The billets are hot rolled into rod, typically having a diameter within the range from about 0.218 inches to about 0.562 inches.

The rod is usually in the form of coils from which wire in continuous lengths is produced by cold working. Depending on the end use the wire may be reduced in diameter to various degrees as described above by conventional wire drawing methods, i.e., by passage through the requisite number of dies under recognized cold working conditions without the necessity of intermediate annealing.

The invention contemplates cold working rod of the boron modified silicon steel described, for example, standard 0.218 inch diameter rod, without the necessity of annealing, to produce wire of different diameters. For circular crosssection wire, for example, these diameters may run from about 0.4375 inches down to about 0.048 inches, like standard diameters of 0.072 inches, 0.0625 inches and 0.045 inches. Frequently required diameters are within the range from about 0.160 inches to about 0.080 inches.

The wire of the invention is specially useful where silicon-killed steel is indicated, for example, for hot dip galvanizing. The wire may also be put to other normal uses for steel wire, for example, for making toys, shelving, baskets and nails, to mention only a few.

EXAMPLE

Scrap steel was selected, being a mix of No. 1 heavy melt, plate and structural, No. 1 or No. 2 shredded, and No. 2 heavy melt to provide a level of residuals less than about 0.50% by weight. The scrap was charged into a 65 ton electric arc furnace and melted. A carbon level of 0.06% was achieved by top-blowing with oxygen. Once the carbon level was reached, the heat was deoxidized by additions of ferro alloys. The form of the addition was 1,000 pounds of silico-manganese and 200 pounds of ferro silicon. The tapping temperature was 2990° F. Tapping into a ladle was then started and 180 pounds of ferro silicon was introduced into the tapping stream during tapping, followed by 100 pounds of calcium silicon, followed by 100 pounds of ferro boron.

The ladle was then taken to a continuous casting machine and the metal poured into the machine and 4×4 inch billets produced.

The billets were hot rolled into wire rods having a diameter of 0.218 inches. The wire rod was chemically descaled and coated.

The rod was then cold-worked at a final speed of 1,080 feet per minute through eight sequential dies to a diameter of 0.048 inches for a total reduction of area of 95.2% and the drawn wire placed on a carrier. The resulting wire had an ultimate tensile strength of 150.3 ksi (150,300 pounds per square inch). No breaks were encountered during drawing and subsequent jig, wrap and bend tests gave good results.

We claim:
1. A method of producing steel wire, comprising, cold working, up to about 95% reduction without annealing into continuous lengths of wire, ductile rod of low-carbon silicon-killed steel produced by melting substantially 100% ferrous scrap containing not more than about 0.90% by weight residuals in an electric furnace in the presence of an amount of boron effective to give a boron analysis of not more than about 0.02% by weight and adjusting the melt so the steel contains an approximate percentage by weight of 0.04% to 0.15% carbon, 0.30% to 0.65% manganese, 0.05% to 0.25% silicon, 0% to 0.035% aluminum and continuously casting the steel into billets and hot-rolling the billets into rod.

2. A method, as defined in claim 1, in which the content of residuals is not more than about 0.50%.

3. A method of cold working, as defined in claim 1, in which the steel contains an approximately percentage by weight of
0.10% to 0.05% carbon
0.45% to 0.30% manganese
0.07% to 0.15% silicon
0% to 0.010% aluminum
0.50% residuals
0.005% to 0.01% boron.

4. A method, as defined in claim 3, in which the content of residuals is not more than about 0.50%.

5. A method comprising,
melting in an electric furnace substantially 100% ferrous scrap containing less than about 0.90% residuals by weight to form molten steel, and adjusting the melt so the steel contains an approximate percentage by weight of 0.04% to 0.15% carbon, 0.30% to 0.65% manganese, 0% to 0.035% aluminum,
adding silicon in an amount effective to deoxidize the melt and to provide residual silicon in an amount from about 0.05% to about 0.25% by weight,
adding boron in an amount from about 0.0005% to about 0.02% by weight,
continuously strand-casting the molten steel into billets,
hot rolling the billets into ductile rod,
cooling the rod, and
cold working the rod up to about 95% reduction without annealing into continuous lengths of wire.

6. A method, as defined in claim 5, in which the steel contains
0.10% to 0.05% carbon
0.45% to 0.30% manganese
0.07% to 0.15% silicon
0% to 0.010% aluminum
0.005% to 0.01% boron and the balance substantially iron.

7. A method, as defined in claim 5 or 6, in which the content of residuals is not more than about 0.50% by weight.

8. A steel wire cold worked up to about 95% reduction without annealing in continuous length form made from ductile rod of continuously strand-cast electric furnace low-carbon low-silicon boron modified steel made by melting essentially 100% scrap containing not more than about 0.90% residuals by weight and adjusting the melt so the steel contains an approximate percentage by weight of 0.04% to 0.15% carbon, 0.30% to 0.65% manganese, 0.05% to 0.25% silicon, 0% to 0.035% aluminum and 0.0005% to 0.02% boron.

9. Cold worked steel wire, as defined in claim 8 in which the steel also contains aluminum in an amount not more than 0.010% by weight.

10. Cold worked steel wire, as defined in claim 8, in which the steel has an analysis
   0.10% to 0.05% carbon
   0.45% to 0.30% manganese
   0.07% to 0.15% silicon
   0.005% to 0.01% boron and
   the balance substantially iron.

11. Cold worked steel wire, as defined in claim 8 in which the residuals content is not more than about 0.50% by weight.

* * * * *